Patented Mar. 26, 1946

2,397,417

UNITED STATES PATENT OFFICE 2,397,417

METHOD OF PRODUCING CURARE PREPARATIONS SUITABLE FOR THERAPEUTIC USE

Horace A. Holaday, Highland Park, N. J., assignor to E. R. Squibb & Sons, New York, N. Y., a corporation of New York No Drawing. Application June 6, 1941, Serial No. 396,871

8 Claims. (Cl. 167—67)

This invention relates to, and has for its object the provision of, stable, physiologically-standardized curare preparations suitable for therapeutic use, and a simple and efficient method of producing them.

Curare is a valuable agent for the treatment of dystonic and spastic conditions, and for the prevention of spinal and extremity fractures in the metrazol (pentamethylenetetrazol) and electroshock therapy of mental conditions; but its use has been limited because stable, physiologically-standardized preparations thereof suitable for therapeutic use—particularly by intravenous injection—have heretofore been unobtainable. The difficulty of providing curare preparations of constant activity and action is due to the fact that commercial (crude) curare is a variable and physically unstable mixture. Since curare's margin of safety (the range of dosage between that giving the desired skeletal-muscle effect and that giving the undesirable toxic paralysis of the muscles of respiration) is small, it is manifestly essential for therapeutic utility that the curare preparation be stable and of accurate potency.

In accordance with this invention, stable, physiologically-standardized curare preparations suitable for therapeutic use are prepared by a method essentially comprising extracting substantially dry—preferably desiccated—crude curare with a substantially dry, volatile, organic curare-solvent (i. e., solvent for curare), transferring the extracted material to aqueous solution, purifying the solution with an activated carbon, assaying the solution for curare-effect activity, and adjusting the solution to the desired potency. The purification treatment removes inert material and material having undesirable physiological properties; and the thus-purified curare is highly active and forms a stable aqueous solution (i. e., the solution remains clear).

Preferably, the crude curare is first extracted with cold water, the water evaporated, and the completely dry residue subjected to extraction with a dry, volatile, organic curare-solvent; the preliminary water extraction serving to prevent extraction by the organic solvent of water-insoluble impurities. Preferably, also, the dry, volatile, organic curare-solvent is an anhydrous lower-aliphatic, monohydric alcohol, and the extraction is effected at an elevated temperature. The utilizable solvents include, inter alia, substantially dry—preferably anhydrous—methanol, isopropanol, and especially ethanol (or a methanol-denatured alcohol). The utilizable activated carbons include, inter alia, Norite and Darco G-60.

The following example is illustrative of the invention:

A. Purification of crude curare

1. A crude curare (syrup) containing 55–60% total solids is extracted with four portions of cold distilled water, the extractions being for 30 minutes each and with respectively 4.0, 2.5, 1.5, and 1.0 cc. water per gram of curare syrup. The volume ratios, number, and duration of the extractions may be varied widely, according to the composition and water content of the curare paste or syrup. The specific extraction described removes about 97% of the water-soluble active alkaloids. The combined extracts are immediately sterilized by autoclaving; the water is then evaporated from the extract, and the residue is converted into a fine dry powder by drying in a thin layer in a vacuum oven and grinding the dried material in a ball mill.

2. The dry powder is extracted with three portions of anhydrous methanol-denatured ethanol (5 volumes methanol to 100 volumes ethanol) by refluxing on a steam bath with constant stirring. Each extraction is for 35 minutes with, respectively, 12, 10, and 7 cc. of the alcohol per gram of powder. The number and duration of the extractions may be varied widely, but the specific extraction described is preferred because it removes about 97% of the alcohol-removable activity.

3. The residue is washed thoroughly with 2.5 cc. cold absolute alcohol per g. of original powder, sucked dry on a Buchner funnel, and dried in a vacuum desiccator.

4. The combined extracts and washings are cooled to room temperature, and filtered by suction through an alundum stone filter; and the filtrate is allowed to stand overnight at room temperature in a balloon flask, and then siphoned from the residue adhering to the bottom of the container.

5. The siphoned extract is evaporated under vacuum to complete dryness, and the dry residue is taken up in sterile, double-distilled water—about 1 cc. water for each 30 units of activity (as herein defined) in the residue—and promptly filtered through sterile paper on a sterilized Buchner funnel. The funnel and containers are rinsed with sterile double-distilled water, and the rinsings added to the filtrate. The filtrate is then immediately autoclaved for one hour. After cooling, the solution (which has a pH of about 4.4–5.5 and contains approximately 87% of the activity of the original drug) is assayed for total solids content and physiological activity. If the following charcoal treatment is carried out immediately after filtration, the solution need not be autoclaved.

6. The pH of the autoclaved solution—the volume of which has been adjusted to correspond to an activity of about 30 units (as herein defined) per cc.—is adjusted to 4.6–5.2, and autoclaved activated charcoal (e. g., Darco G-60) is added in the amount of about 4–6 mg./cc. (the optimum amount being determined empirically by trial treatments of aliquot samples to obtain adsorption curves with respect to solids and with respect to activity removed by the charcoal). The mixture is shaken or stirred for an hour, and filtered promptly through sterilized paper on a sterilized Buchner funnel to remove excess charcoal. It is then passed through a Seitz filter, and autoclaved for an hour.

B. *Standardization of the curare solution*

A sample of the solution of purified curare obtained by the foregoing procedure is assayed to determine its curare-affect activity in terms of a suitable standard material. For this purpose, the following specific, rapid, and quantitative method of biological assay has been devised.

The method is based on the observation that slow injection of a curare preparation into a suitable vein of an animal (e. g., the ear vein of a rabbit) will produce a temporary paralysis of certain muscles (e. g., the muscles of the head and neck and extremities of the rabbit) without paralyzing the respiratory muscles, and if the dose is properly controlled these muscles will reach a degree of flaccidity after injection has been continued for a certain time (e. g., 4–7 minutes in the case of rabbits) which just prevents the animal from using the muscle while suitably positioned (e. g., prevents the rabbit from raising its head when tied belly-down on an animal board). Mice (injection in tail vein), cats and dogs (injection in leg vein), and monkeys (injection in wrist vein), inter alia, may be used, but rabbits are preferred because of the sharpness of the end point and because the marginal ear vein of the rabbit readily permits of frequent injections.

When a rabbit is tied belly-down on an animal board it normally holds its head up. The curare preparation is injected into the ear vein at a constant rate (e. g., 0.10 cc. every 15 seconds) until the rabbit's head begins to drop; then the rate is reduced (e. g., to 0.05 cc. every 15 seconds) until the rabbit's head rests on the board and the rabbit is unable to raise its head even when stimulated. The paralysis is of short duration (8–15 minutes).

Since the doses of curare required by different rabbits vary as much as 150%, but the dose of curare required by each rabbit for tests on successive days remains constant, the rabbits are "crossed-over" to obtain a reliable assay. Thus, the curare preparation to be assayed is tested one day on at least 8 rabbits, and an equal number are subjected to the test using a solution of the reference standard. On the following day, the rabbits are crossed-over, i. e., those which were injected with the standard are now injected with the preparation to be assayed, and vice versa. The activity ratio of the sample to be assayed to the reference standard is calculated directly from the corresponding volumes of test sample and reference standard required in each rabbit. The probable error of the average of 16 ratios is usually less than 2%. The accuracy of this biological standardization has received ample clinical confirmation.

Using the foregoing cross-over rabbit-head-drop test, the activity of the reference standard curare may be related to a definite chemical compound, e. g., quinine methochloride. Thus, the dried crude curare (see A1 supra) used as a reference standard was found to have 5.26 times the activity of this compound; and a unit of activity was considered to be the amount of activity in the aqueous extract of 1 mg. of this reference standard.

C. *Production of a therapeutic curare preparation*

The purified and standardized curare solution is diluted with the volume of a saline-diluent solution containing a preservative (preferably chlorbutanol) required to produce a physiological saline preparation of the desired activity. For example, the sodium chloride and chlorbutanol contents of the diluent are adjusted so that the finished preparation will contain 0.50% sodium chloride and 0.5% chlorbutanol; and the activity is made equivalent to that of an aqueous solution containing 20 mg./cc. of the reference standard curare. The resulting preparation is filtered through a stone filter candle and tested for sterility, and is then ready for therapeutic use. It is a sterile, stable, physiologically-standardized aqueous solution of curare. Since the preparation contains less than 0.33 mg. solids per unit of activity (as herein defined) compared with 0.67 mg. solids per unit of activity in the crude drug, the purified curare is over 100% more active than the crude drug. The therapeutic utility of this preparation has been amply confirmed by clinical tests.

D. *Recovery of residual curare activity*

The residue obtained in procedure A3 contains solids of low curare activity which are insoluble in alcohol, inert material which slowly precipitates from aqueous solution, and material which causes a decline in blood pressure when injected intravenously in cats. This residue may be combined with the dried residue obtained in procedure A4, the solid material obtained by filtration in procedure A5, and an evaporated 50% alcohol extract of the charcoal residue obtained in procedure A6 (when this residue contains any significant activity); and the combined residues treated for recovery of residual curare activity; but such recovery must be very cautiously carried out since there are to be found in these fractions active alkaloids which possess undesirable physiological properties.

The invention may be variously otherwise embodied within the scope of the appended claims.

I claim:

1. In the method of producing a stable, physiologically-standardized aqueous solution of curare suitable for therapeutic use, the steps of extracting substantially dry, crude curare with a substantially dry, volatile, organic curare-solvent, transferring the extracted material to aqueous solution, treating the solution with an activated carbon, and removing the carbon.

2. In the method of producing a stable, physiologically-standardized aqueous solution of curare suitable for therapeutic use, the steps of extracting crude curare with water, removing the water from the extract and substantially drying the residue, extracting the residue with a substantially dry, volatile, organic curare-solvent, transferring the extracted material to aqueous solution, treating the solution with an activated carbon, and removing the carbon.

3. In the method of producing a stable, physiologically-standardized aqueous solution of curare suitable for therapeutic use, the steps of extracting substantially dry, crude curare with a substantially dry, lower-aliphatic monohydric alcohol, transferring the extracted material to aqueous solution, treating the solution with an activated carbon, and removing the carbon.

4. In the method of producing a stable, physiologically-standardized aqueous solution of curare suitable for therapeutic use, the steps of extracting dry crude curare with an anhydrous, volatile, organic curare-solvent, transferring the extracted material to aqueous solution, treating the solution with an activated carbon, and removing the carbon.

5. In the method of producing a stable, physiologically-standardized aqueous solution of curare suitable for therapeutic use, the steps of extracting dry crude curare with anhydrous ethanol, transferring the extracted material to aqueous solution, treating the solution with an activated carbon, and removing the carbon.

6. In the method of producing a stable, physiologically-standardized aqueous solution of curare suitable for therapeutic use, the steps of extracting dry crude curare with anhydrous ethanol at an elevated temperature, transferring the extracted material to aqueous solution, treating the solution with an activated carbon, and removing the carbon.

7. In the method of producing a stable, physiologically-standardized aqueous solution of curare suitable for therapeutic use, the steps of extracting substantially dry, crude curare with a substantially dry, volatile, organic curare-solvent, removing the solvent from the extract by evaporation in vacuo, dissolving the residue in water, treating the solution with an activated carbon, and removing the carbon.

8. In the method of producing a stable, physiologically-standardized aqueous solution of curare suitable for therapeutic use, the steps of extracting substantially dry, crude curare with a substantially dry, volatile, organic curare-solvent, transferring the extracted material to aqueous solution, adjusting the pH of the solution to about 4.6–5.2, treating the solution with an activated carbon, and removing the carbon.

HORACE A. HOLADAY.